(No Model.) 2 Sheets—Sheet 1.
C. C. REYNOLDS, H. HOOTON & M. M. BUSBY.
BRAKE.
No. 438,491. Patented Oct. 14, 1890.
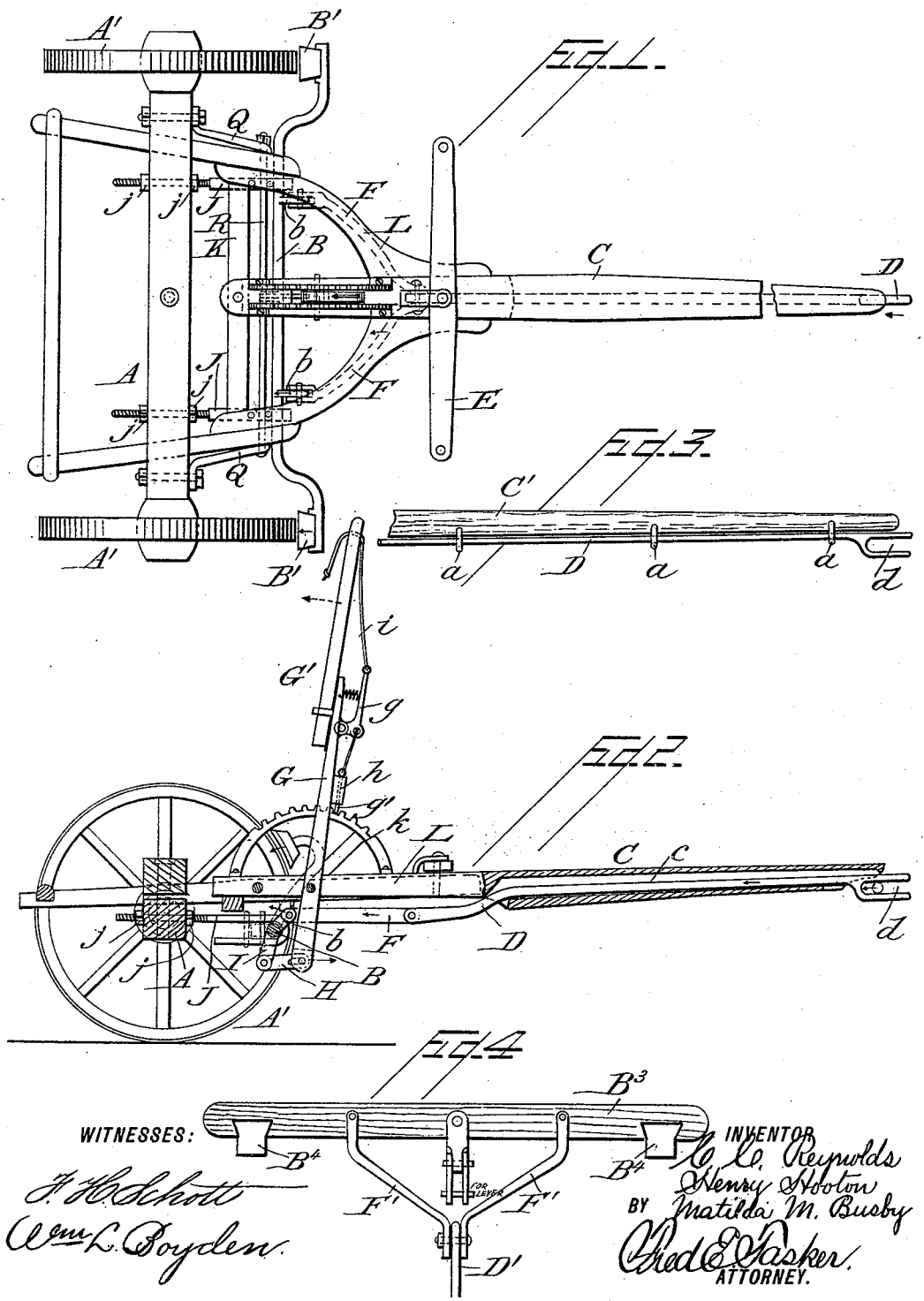
WITNESSES:
F. H. Schott
Wm L. Boyden
INVENTOR
C. C. Reynolds
Henry Hooton
Matilda M. Busby
BY Fred E. Tasker
ATTORNEY.

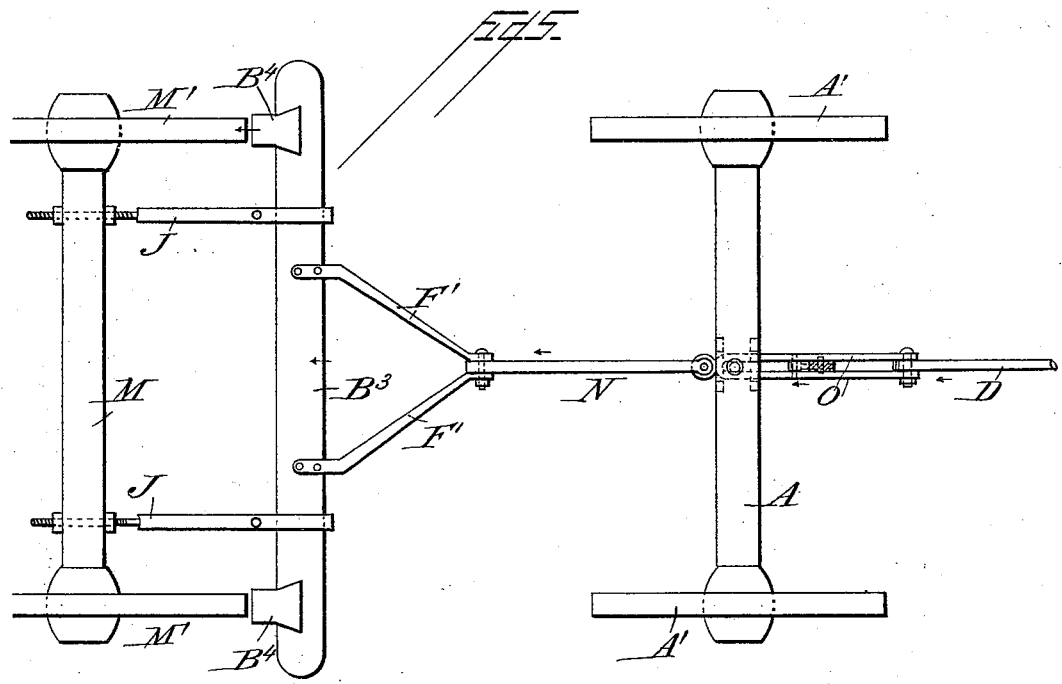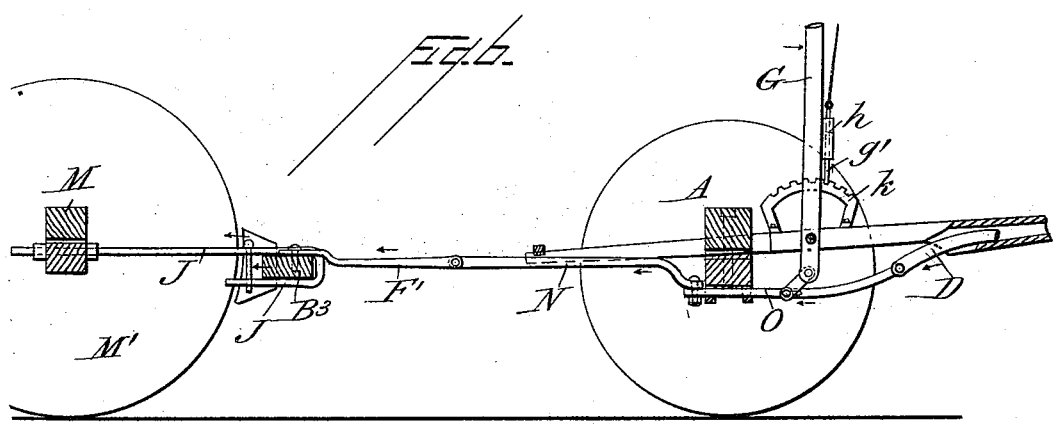

UNITED STATES PATENT OFFICE.

CHRISTOPHER C. REYNOLDS, HENRY HOOTON, AND MATILDA M. BUSBY, OF SALT LAKE CITY, UTAH TERRITORY.

BRAKE.

SPECIFICATION forming part of Letters Patent No. 438,491, dated October 14, 1890.

Application filed May 8, 1890. Serial No. 351,047. (No model.)

*To all whom it may concern:*

Be it known that we, CHRISTOPHER C. REYNOLDS, HENRY HOOTON, and MATILDA M. BUSBY, citizens of the United States, residing at Salt Lake City, in the county of Salt Lake and Territory of Utah, have invented certain new and useful Improvements in Brakes; and we do hereby declare the following to be a full, clear, and exact description of the invention, such as will enable others skilled in the art to which it appertains to make and use the same.

Our invention has reference to an improvement in brakes for wagons, carts, or other vehicles, the object of the invention being to provide a cheap, simple, and efficient brake which may be operated automatically by the action of the horse or other draft-animal when the vehicle is descending a hill, or may be actuated by the hand of the driver, whichever mode of operation may be preferred; and the invention to this end consists, essentially, in the construction, arrangement, and combination of parts, substantially as will be hereinafter described and claimed.

In the accompanying drawings, illustrating our invention, Figure 1 is a top plan view of a vehicle provided with our improved brake. Fig. 2 is a side elevation of the same in partial section. Fig. 3 is a detail view of the tongue or pole made solid, with the tongue-rod arranged on the outside thereof instead of being hollow with the tongue-rod arranged inside, as is indicated in Fig. 2. Fig. 4 is a detail plan view of a modified form of the brake-beam and its connections. Fig. 5 is an outline plan view showing the application of our improved brake to the rear wheels of a four-wheeled vehicle. Fig. 6 is a sectional side elevation of the same.

Similar letters of reference designate corresponding parts throughout all the different figures of the drawings.

Our improved brake is applicable to vehicles of many and various kinds, such as wagons, carriages, carts, buggies, &c.

In the example of vehicle shown in Figs. 1 and 2 we have represented a two-wheeled cart, A being the axle, and A' the wheels. C denotes the tongue or pole; L, the horizontal framework; K, the cross-piece, to which the inner end of the tongue is pivoted, while Q Q denote brace-rods, bolted at one end to the axle and having the tie-rod R passing through their other ends as well as through the contiguous frame-work of the wagon-body, the extremities of said tie-rods being provided with nuts, as shown. These and other parts make up the structure of the body of the vehicle to which in the present instance our brake is shown as applied for practical operation; but doubtless this structural combination of the vehicle might vary without departing from the invention, or any other vehicle might be substitued therefor, inasmuch as the brake is applicable, as before stated, to a great diversity of carriages.

D designates the tongue-rod of the brake. It has its outer end formed with a forked or bifurcated end d, which is adapted to receive some portion of the yoke or harness, by means of which a backward pressure is exerted upon the tongue-rod D for the purpose of braking the wagon through the connections, as we shall proceed presently to explain. The tongue-rod D may be held either as shown in Fig. 2 or as indicated in Fig. 3. The tongue C, therefore, may be hollow, as in Fig. 2, or solid, as in Fig. 3. When hollow, it is so made to contain the tongue-rod. We prefer to make the tongue of steel or other strong and durable metal, so that it may have great strength, and it is a convenient way to form it hollow, so that it may contain the tongue-rod. However, if it is made of wood and made solid, the tongue-rod D can easily be located alongside of and held by the staples or loops a a, which are driven into the tongue or pole, as C', Fig. 3.

E designates the whiffletree pivoted to the tongue C.

The inner end of the tongue-rod D is pivoted to the two diagonal rods F F, the other ends of which are in turn pivoted to the projections b b on the brake beam or bar B, which carries at either end the brake-shoes B' B', which are in proximity to and adapted to come in contact with the wheels during the operation of setting the brakes. The brake-beam B is supported by means of the horizontal rods J J, which are properly looped to inclose the brake-bar, and are also screwthreaded where they pass through the axle, so as to be provided with nuts $j\ j$, located on each side of the axle and tightly screwed up against the same. Thus it will be seen that these brake-rod supports J J are capable of adjustment, so that they may be regulated in the proper position to compensate for the wear upon the brake-shoes consequent upon continual use of the same. The automatic operation of setting the brakes, therefore, when the horses or other animals pull back, and thus forcing the tongue-rod D to the rearward, will be readily understood from the foregoing description of the construction of the parts of the brake, it being seen that as the tongue-rod moves backward the diagonal rods F F will operate to press the brake-bar laterally and thus cause the brake-shoes to come close against the wheels.

The brakes may be operated by hand, if desired.

G denotes a hand-lever pivoted to the frame of the vehicle. Pivoted to this lever near its upper end is a spring-actuated lever $g$, which is connected by a link with the bolt $g'$, held within a socket $h$, said bolt $g'$ entering the dentations in the sector $k$, carried on the vehicle-frame. The lower end of the lever G connects by a link H with a part I, belonging to the brake-bar B. Thus the driver by laying hold of the lever G can rotate the same upon its pivot and cause the brakes to operate upon the wheels.

$G'$ is a supplemental handle, which is affixed to the lever-handle G, when so desired, by being secured thereto near its upper end, and in connection with this supplemental handle we employ a rope $i$, passing through a perforation in the handle $G'$, near its upper end, and being connected to the spring-actuated lever $g$. Thus the driver when he wishes to use this construction can operate the brake by means of the handle $G'$ and the rope $i$ as well as he could with the lever G and lever $g$. This will be of great use when there are high loads on the vehicle which would render it impossible to operate the brake by the handle G, the load being high above said handle; but by the handle $G'$, which extends upward so much farther, the operation of the brake can be easily accomplished.

Instead of the form of brake-bar shown in Figs 1 and 2, which consists of a metallic rod bent into proper shape, we may employ a wooden brake-beam, as indicated in Fig. 4, where $B^3$ represents the wooden beam carrying the brake-shoes $B^4\ B^4$. In this case $D'$ indicates the tongue-rod, which is pivoted to the diagonal rod $F'\ F'$, the inner ends of which are in turn bolted to the wooden brake-beam $B^3$.

In Fig. 5 we have represented a plan view of a four-wheeled vehicle provided with our improved brake. In this modification the brake is applied to the rear wheels of the vehicle instead of to the front wheels. It simply shows a different application of the same invention.

In Figs. 5 and 6, $B^3$ denotes the brake-beam, having the brake-shoes $B^4\ B^4$ adapted to come into contact with the rear wheels $M'\ M'$ on the axle M, said brake-beam being supported by the rods J J, which pass through the axle, and are provided with nuts similar to the arrangement of the brake-beam-supporting bars, as shown in Fig. 1. The tongue-rod D is pivoted to a loop O, which passes beneath the forward axle and is pivoted to the link-connection N, which in turn is pivotally connected to the diagonal braces $F'\ F'$, that are bolted to the brake-beam $B^3$. In this modification of the invention, instead of having the automatically-operating tongue-rod which passes through the hollow tongue simply, we may also have the hand devices, as shown partially in Fig. 6, consisting of the lever G, the dentated sector $k$, the bolt $g'$ in its socket $h$, and the other accompanying parts.

It will be noted that the wooden brake-beam shown in Fig. 4 may be substituted for the metallic bar shown in Figs. 1 and 2, and in order that this may be easily done, and that the brake-beam supports J J may serve equally well to uphold the wooden beam as for the metal one, said supports J J are provided with extra perforations, through which the bolts for holding the brake-beam in position may pass, as indicated in Figs. 1 and 2.

Having thus described our invention, what we claim as new, and desire to secure by Letters Patent, is—

1. In a brake, the combination of the vehicle-tongue C, the rod D, having the bifurcated forward end $d$, brake-beam B, carrying shoes $B'\ B'$, the diagonal rods F F, pivoted to the rod D and likewise to the brake-beam, and the beam-supports J J, bolted to the vehicle-axle, said supports being provided with nuts located on each side of the axle, whereby the supports may be adjusted to compensate for wear on the brake-shoes, substantially as described.

2. In a brake, the combination of the hollow vehicle-tongue C, the rod D, inclosed within the same and having a bifurcated forward end $d$, the brake-beam B, carrying shoes $B'\ B'$, the diagonal rods F F, pivoted to the rod D and likewise to the brake-beam, the beam-supports J J, bolted to the vehicle-axle, said supports being provided with nuts located on each side of the axle, whereby the supports may be adjusted to compensate for wear on the brake-shoes, the pivoted lever G, the connecting-rod H, pivoted thereto, and the part I, fastened to the brake-beam, together with the locking devices with which the lever G is provided.

3. In a brake, the following parts in combination: the hollow tongue C, the rod D, inclosed within the same and having a bifurcated forward end $d$, the brake-beam B, carrying shoes $B'\ B'$, the diagonal rods F F, pivoted to the rod D and likewise to the brake-beam, the beam-supports J J, bolted to the vehicle-axle, said supports being provided with nuts located on each side of the axle, the pivoted operating-lever G for the brake-beam, provided with locking devices, the connecting-rod H pivoted thereto, the part I, the supplemental lever G', secured to the upper end of the lever G, and the cord $i$, connected to the locking devices of said lever G, substantially as described.

In testimony whereof we affix our signatures in presence of two witnesses.

CHRISTOPHER C. REYNOLDS.
    HENRY HOOTON.
    MATILDA M. BUSBY.

Witnesses:
    HUGH L. EYLER,
    S. P. ARMSTRONG.